United States Patent
Miyazawa et al.

[11] Patent Number: 5,818,122
[45] Date of Patent: Oct. 6, 1998

[54] POWER SUPPLY CIRCUIT BREAKING APPARATUS FOR MOTOR VEHICLE AND POWER SUPPLY CIRCUIT BREAKING SYSTEM FOR MOTOR VEHICLE

[75] Inventors: Yasuhiro Miyazawa; Isao Takiguchi; Daisuke Takanohashi; Hiroshi Miyamoto, all of Shizuoka, Japan

[73] Assignee: Yazaki Corporation, Tokyo, Japan

[21] Appl. No.: 828,033

[22] Filed: Mar. 27, 1997

[30] Foreign Application Priority Data

Mar. 28, 1996  [JP]  Japan .................................. 8-074790

[51] Int. Cl.⁶ .................................................. B60K 28/14
[52] U.S. Cl. ........................ 307/10.7; 180/282; 280/734; 307/10.1; 340/436
[58] Field of Search ........................ 307/9.1, 10.1, 307/10.7, 121; 340/669, 436, 438, 440; 280/734, 735; 180/271, 282, 279, 283, 284; 200/61.45 R; 429/61, 150

[56] References Cited

U.S. PATENT DOCUMENTS

| | | | |
|---|---|---|---|
| 4,861,684 | 8/1989 | Law | 429/150 |
| 5,120,617 | 6/1992 | Cameron | 429/61 |
| 5,238,083 | 8/1993 | Horie et al. | 200/61.45 R |
| 5,389,824 | 2/1995 | Moroto et al. | 307/10.1 |
| 5,535,842 | 7/1996 | Richter et al. | 180/271 |
| 5,565,711 | 10/1996 | Hagiwara | 307/10.1 |
| 5,574,316 | 11/1996 | Nieschultz | 307/10.1 |

*Primary Examiner*—Richard T. Elms
*Attorney, Agent, or Firm*—Armstrong, Westerman, Hattori, McLeland & Naughton

[57] ABSTRACT

A circuit breaking control unit receives an impact detection signal that is outputted from outside when an impact such as a crash of a motor vehicle has been detected, and generates and applies a circuit breaking control signal based on the impact detection signal. A circuit breaking unit forcibly interrupts a power supply path and stops the supply of power to a load. Therefore, the supply of power can be stopped immediately at the time the impact has been detected. In addition, a second load is a minimum electric system that is essential to cause the motor vehicle to travel. Therefore, even if the supply of power to the load is interrupted, the motor vehicle can be caused to travel. Hence, even at the time of an accident or the like, the motor vehicle can be moved to the edge of a road or the like with ease.

15 Claims, 12 Drawing Sheets

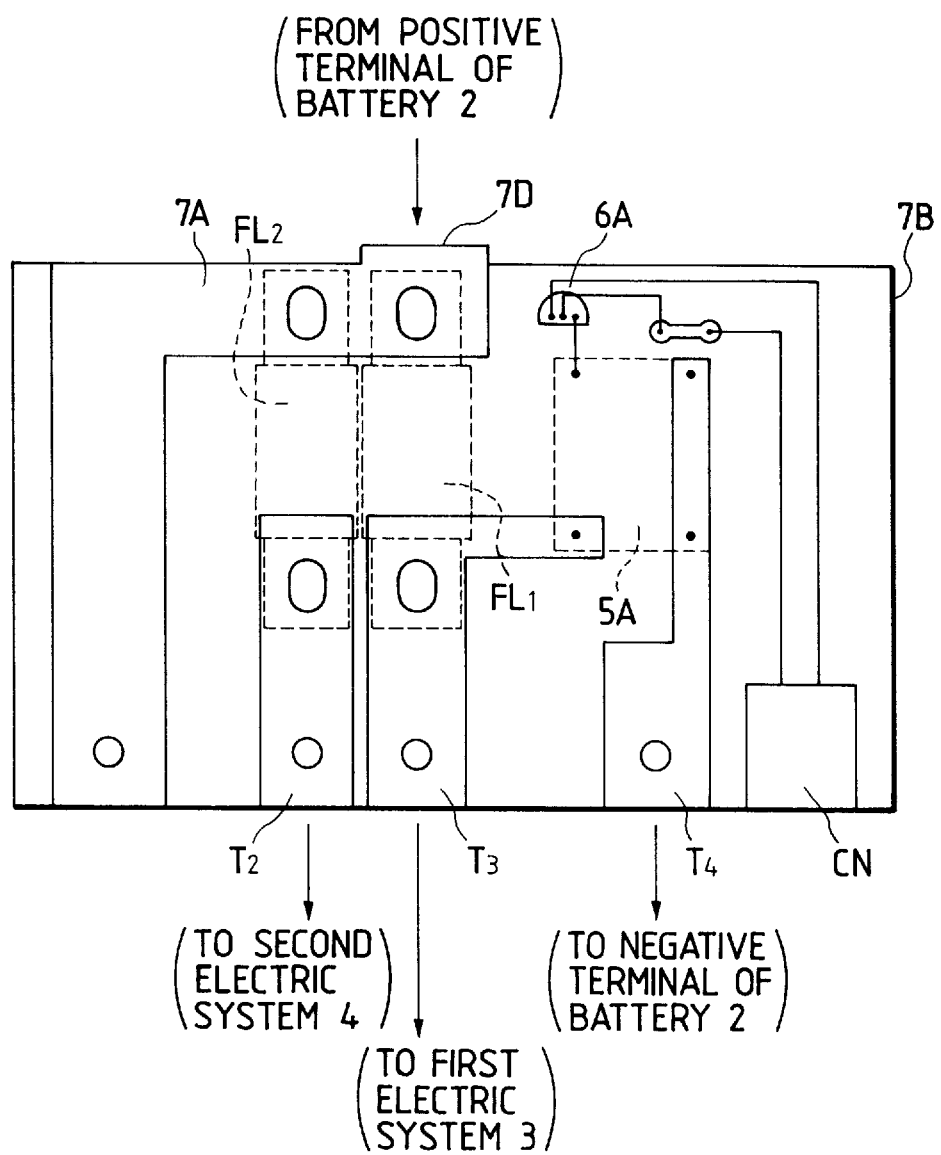

POWER SUPPLY CIRCUIT BREAKING APPARATUS FOR MOTOR VEHICLE AND POWER SUPPLY CIRCUIT BREAKING SYSTEM FOR MOTOR VEHICLE

BACKGROUND OF THE INVENTION

The present invention relates to a power supply circuit breaking apparatus for a motor vehicle and a power supply circuit breaking system for a motor vehicle. More particularly, the present invention is directed to a power supply circuit breaking apparatus for a motor vehicle and a power supply circuit breaking system for a motor vehicle which forcibly interrupts the supply of power to a load from the battery to be mounted on the motor vehicle through a predetermined power supply path at the time an impact such as a crash of the motor vehicle is applied.

When a strong impact such as in the case of a crash of a motor vehicle is applied to the motor vehicle, an electric leakage occurs at the battery mounted on the motor vehicle and sparks are given off. As a result, the sparks ignite the exuding fuel to thereby cause a fire or other secondary accident.

In order to prevent such a fire or secondary accident from happening, power supply circuit breaking apparatuses have heretofore been employed. The power supply circuit breaking apparatuses interrupt the supply of power to an electric system of the motor vehicle at the time an impact has been applied, the electric system being a load.

Among such power supply circuit breaking apparatuses, an apparatus, which has a fusible link interposed between the battery mounted on the motor vehicle and the electric system of the motor vehicle, has been known. That is, in the case where there is an leakage at the battery or in a like case, an overcurrent flows, so that the fusible link is fused and the supply of power is thus interrupted.

The aforementioned conventional power supply circuit breaking apparatus is unitized in a unit and is generally arranged within the engine room. The power supply circuit breaking apparatus must operate even if the engine room has been destroyed by a frontal crash of the motor vehicle. That is, even in such a case, an electric leakage between the fusible link and the battery and an electric leakage at wiring harnesses must be prevented reliably in order to prevent the trouble in which oil, gasoline, and the like are ignited by sparks or the like caused by the electric leakage and the motor vehicle is thereby set afire.

Once an electric leakage path has been formed through the body of the motor vehicle or the like, not through the fusible link, no overcurrent flows through the fusible link, and it may be likely that the fusible link is not fused. However, even in this case, occurrence of an electric leakage must be prevented.

By the way, it is assumed that there is a relationship between acceleration change timing and occurrence of an electric leakage, the acceleration being received by a motor vehicle in an accident such as a crash.

FIG. 15 shows an example of an acceleration change curve when a motor vehicle has crashed at a speed of 50 km/h.

According to FIG. 15, there comes a first peak 75 msec after the crash and there comes a second peak 125 msec after the crash.

Therefore, since it is likely that an electric leakage will occur after the first peak has been detected, occurrence of a disaster attributable to the electrical leakage can be suppressed if the power supply path of the battery mounted on the motor vehicle is interrupted within 75 msec after the crash.

SUMMARY OF THE INVENTION

Therefore, a first object of the present invention is to provide a power supply circuit breaking apparatus for a motor vehicle that, when an excessive impact such as a crash of the motor vehicle has been applied, can implement power supply circuit breaking reliably as well as rapidly with a simple construction.

A second object of the present invention is to provide a power supply circuit breaking apparatus for a motor vehicle that, when an excessive impact such as a crash of the motor vehicle has been applied, can not only implement power supply circuit breaking reliably as well as rapidly with a simple construction, but also reset the supply of power with ease.

A third object of the present invention is to provide a power supply circuit breaking system for a motor vehicle that, when an excessive impact such as a crash of the motor vehicle has been applied, can not only implement power supply circuit breaking reliably as well as rapidly with a simple construction, but allows the damaged motor vehicle to be moved to the edge of a road or the like with ease after the power supply has been interrupted.

To overcome the aforementioned problems, the invention according to a first aspect is applied to a power supply circuit breaking apparatus for a motor vehicle which interrupts power supplied to a load from a battery to be mounted on the motor vehicle through a power supply path, the power supply circuit breaking apparatus including: a circuit breaking control means for receiving an impact detection signal outputted when an impact such as a crash of the motor vehicle has been detected from outside, and generating and applying a circuit breaking control signal based on the impact detection signal; and a circuit breaking means for interrupting the power supply path forcibly and stopping the supply of power to the load based on the circuit breaking control signal.

According to the invention of the first aspect, the circuit breaking control means receives an impact detection signal that is outputted from outside when an impact such as a crash of the motor vehicle has been detected, and generates and applies a circuit breaking control signal based on the impact detection signal.

The circuit breaking means interrupts the power supply path forcibly and stops the supply of power to the load based on the circuit breaking control signal.

The invention of a second aspect is characterized in that in the invention of the first aspect, the impact detection signal is an air bag operating signal to be applied at the time an air bag is operated.

In addition to the operation of the invention of the first aspect, according to the invention of the second aspect, the impact detection signal is an air bag operating signal to be applied at the time an air bag is operated. Therefore, the supply of power can be stopped at the time the air bag is operated without arranging any special circuits.

The invention of a third aspect is characterized in that in the invention of the first or second aspect, the power supply path includes an interrupted condition holding means for holding an interrupted condition irreversibly; and the circuit breaking means brings the interrupted condition holding means into an interrupted condition forcibly based on the circuit breaking control signal.

In addition to the operation of the invention of the first or second aspect, according to the invention of the third aspect, when the circuit breaking means brings the interrupted condition holding means into an interrupted condition forcibly based on the circuit breaking control signal, the interrupted condition holding means holds the interrupted condition irreversibly, so that the power supply path is kept broken.

The invention of a fourth aspect is characterized in that in the invention of the third aspect, the interrupted condition holding means includes a fusible link; and the circuit breaking means brings the fusible link into a cut condition forcibly based on the circuit breaking control signal so as to bring the interrupted condition holding means into the interrupted condition.

In addition to the operation of the invention of the third aspect, according to the invention of the fourth aspect, the circuit breaking means brings the fusible link into the cut condition forcibly based on the circuit breaking control signal so at to bring the interrupted condition holding means into the interrupted condition, so that the supply of power is stopped.

The invention of a fifth aspect is characterized in that in the invention of the fourth aspect, the circuit breaking means has a forcibly short-circuiting means for short-circuiting the fusible link forcibly.

In addition to the operation of the invention of the fourth aspect, according to the invention of the fifth aspect, the forcibly short-circuiting means of the circuit breaking means short-circuits the fusible link forcibly to forcibly fuse the fusible link, so that the supply of power is stopped.

The invention of a sixth aspect is characterized in that in the invention of the fourth aspect, the circuit breaking means has a forcibly cutting means for mechanically cutting the fusible link.

In addition to the operation of the invention of the fourth aspect, according to the invention of the sixth aspect, the forcibly cutting means of the circuit breaking means mechanically cuts the fusible link, so that the supply of power is stopped.

The invention of a seventh aspect is characterized in that in the invention of the sixth aspect, the forcibly cutting means includes: an inflator that is ignited based on the circuit breaking control signal; and a cutting means that is driven by the pressure of a gas produced by the inflator.

In addition to the operation of the invention of the sixth aspect, according to the invention of the seventh aspect, the inflator of the forcibly cutting means is ignited based on the circuit breaking control signal, and the cutting means mechanically cuts the fusible link while driven by the pressure of the gas produced by the inflator.

The invention of an eighth aspect is characterized in that in the invention of the seventh aspect, the cutting means includes: a rotating shaft; and a blade member for mechanically cutting the fusible link by rotating about the rotating shaft while driven by the pressure of the gas, the blade member being made of a nonconducting material.

In addition to the operation of the invention of the seventh aspect, according to the invention of the eighth aspect, the blade member of the cutting means mechanically cuts the fusible link by rotating about the rotating shaft while driven by the pressure of the gas, so that the supply of power is stopped.

The invention of a ninth aspect is characterized in that in the invention of any one of the first to eighth aspects, the circuit breaking control means and the circuit breaking means are integrally formed with each other.

In addition to the operation of the invention of in any one of the first to eighth aspects, according to the invention of the ninth aspect, the circuit breaking control means and the circuit breaking means are integrally formed with each other. Therefore, these member can be replaced as a single body.

The invention of tenth aspect is characterized in that in the invention of the first or second aspect, the power supply path includes an interrupted condition holding means that not only holds an interrupted condition reversibly, but also is manually resettable to a conducting condition from the interrupted condition; and the circuit breaking means brings the interrupted condition holding means into the interrupted condition forcibly based on the circuit breaking control signal.

In addition to the operation of the invention of the first or second aspect, according to the invention of tenth aspect, when the circuit breaking means brings the interrupted condition holding means of the power supply path into the interrupted condition forcibly based on the circuit breaking control signal, the interrupted condition holding means holds the interrupted condition reversibly. Therefore, the interrupted condition can be reset with ease.

The invention of eleventh aspect is characterized as further including, in the invention of any one of the first to tenth aspects, a second power supply path for supplying power to a second load from the battery, the second load being different from the load.

In addition to the operation of the invention of any one of the first to tenth aspects, according to the invention of the eleventh aspect, the power supply circuit breaking apparatus has a second power supply path for supplying power to a second load from the battery, the second load being different from the load. Therefore, even if the supply of power is stopped to the load, power can be continuously supplied to the second load.

The invention of twelfth aspect is characterized in that in the invention of the eleventh aspect, a current capacity supplied to the second load through the second power supply path is set to a value smaller than a current capacity supplied to the load through the power supply path by a predetermined quantity.

In addition to the operation of the invention of the eleventh aspect, according to the invention of the twelfth aspect, the current capacity supplied to the second load through the second power supply path is set to a value smaller than the current capacity supplied to the load through the power supply path by a predetermined quantity. Therefore, safety can be ensured with ease in continuously supplying power to the second load.

The invention of thirteenth aspect is characterized in that in the invention of the eleventh or twelfth aspect, the second load is a minimum electric system that is essential to cause the motor vehicle to travel.

In addition to the operation of the invention of the eleventh or twelfth aspect, according to the invention of thirteenth aspect, the second load is a minimum electric system that is essential to cause the motor vehicle to travel. Therefore, the motor vehicle can be caused to travel even with the supply of power to the load interrupted.

The invention of fourteenth aspect is characterized as including, in a power supply circuit breaking system for a motor vehicle having a power supply circuit breaking apparatus for a motor vehicle of any one of the first to thirteenth aspect, a second power supply path for supplying power to a second load from the battery, the second load being different from the load.

According to the invention of the fourteenth aspect, the second power supply path supplies power to a second load from the battery, the second load being different from the load.

The invention of a fifteenth aspect is characterized in that in the invention of fourteenth aspect, a current capacity supplied to the second load through the second power supply path is set to a value smaller than a current capacity supplied to the load through the power supply path by a predetermined quantity.

In addition to the operation of the invention of fourteenth aspect, according to the invention of the fifteenth aspect, the current capacity supplied to the second load through the second power supply path is set to a value smaller than the current capacity supplied to the load through the power supply path by a predetermined quantity. Therefore, safety can be ensured with ease in continuously supplying power to the second load.

The invention of sixteenth aspect is characterized in that in the invention of the fourteenth or fifteenth aspect, the second load is a minimum electric system that is essential to cause the motor vehicle to travel.

In addition to the operation of the invention of the fourteenth or fifteenth aspect, according to the invention of the sixteenth aspect, the second load is a minimum electric system that is essential to cause the motor vehicle to travel. Therefore, the motor vehicle can be caused to travel even with the supply of power to the load interrupted.

BRIEF DESCRIPTION OF THE DRAWINGS

FIG. 4 is a diagram illustrative of the power supply circuit breaking unit according to the first embodiment in detail.

DETAILED DESCRIPTION OF THE INVENTION

Preferred embodiments of the present invention will now be described with reference to the drawings.

First Embodiment

Figure 1:
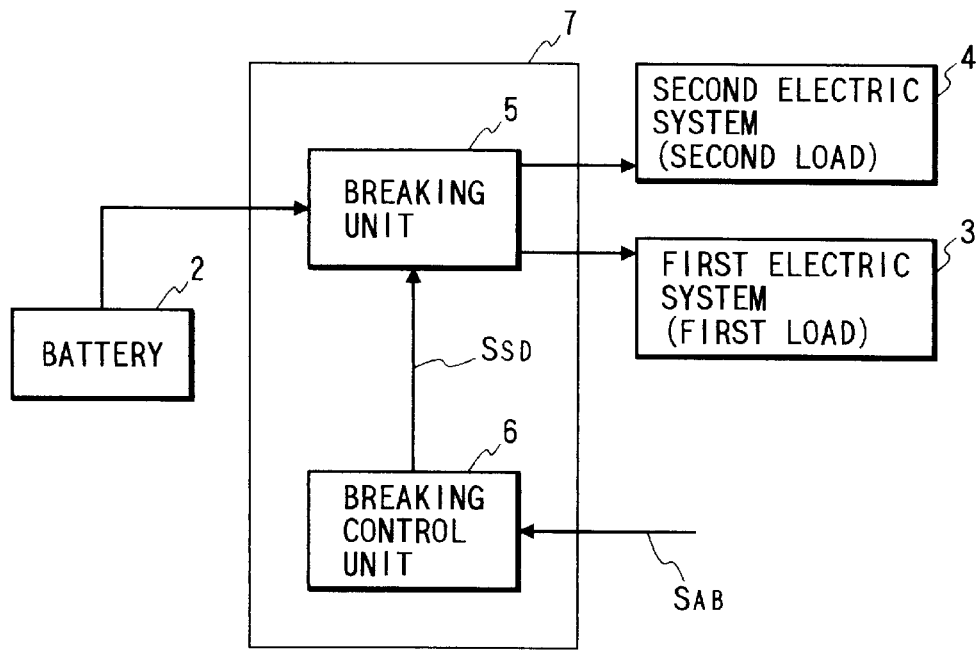
FIG. 1 is a block diagram showing a general configuration of a power supply circuit breaking system for a motor vehicle, which is a first embodiment.

FIG. 1 is a block diagram showing a general configuration of the first embodiment.

A power supply circuit breaking system 1 for a motor vehicle includes: a battery 2 to be mounted on the motor vehicle; a circuit breaking unit 5; and a circuit breaking control unit 6. The battery 2 supplies power to various electric systems of the motor vehicle. The circuit breaking unit 5 is arranged along a power supply path to a first electric system 3 that is a load to which power is supplied from the battery 2 and along a power supply path to a second electric system 4 that is a second load to which power is supplied from the battery 2, and stops the supply of power to the first electric system 3 based on a circuit breaking control signal $S_{SD}$. The circuit breaking control unit 6 generates and outputs a circuit breaking control signal $S_{SD}$ based on an air bag operating signal $S_{AB}$ to be received from an air bag ECU (Electronic Control Unit) at the time an air bag is operated (the air bag is inflated).

In this case, the first electric system 3 is related to devices such as an air conditioner and an ABS (Antilock Braking System) that are not essential to drive the motor vehicle, whereas the second electric system 4 is related to devices such as a starter motor drive circuit and an EFI (Electronic Fuel Injection system) that are essential to drive the motor vehicle.

Further, the circuit breaking unit 5 and the circuit breaking control unit 6 constitute a power supply circuit breaking unit 7 that serves as the power supply circuit breaking apparatus for a motor vehicle.

Figure 2:
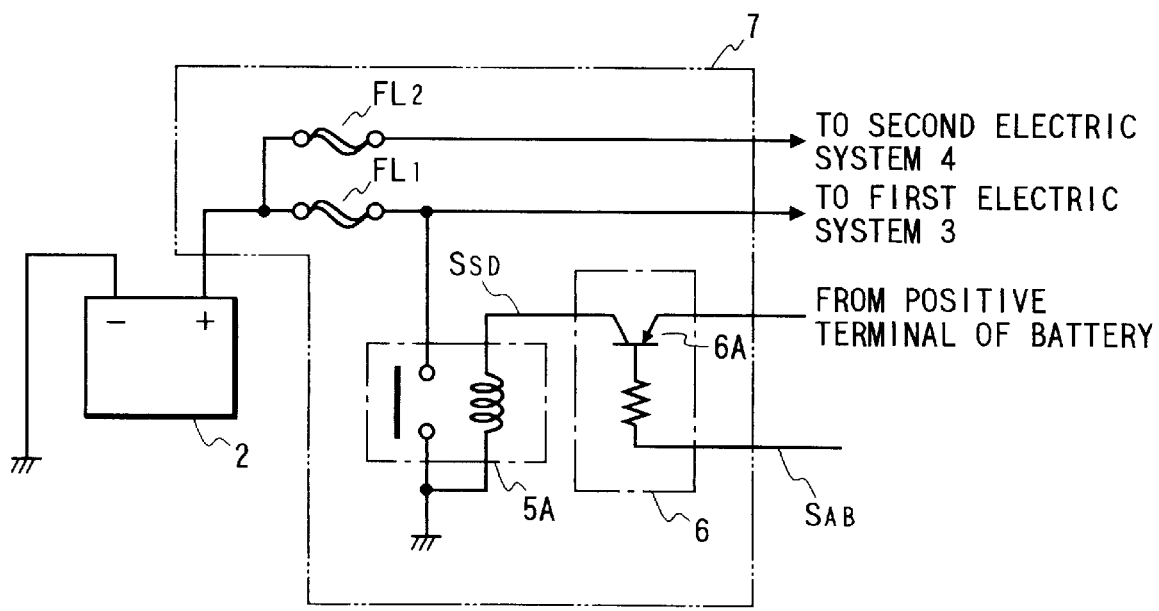
FIG. 2 is a diagram showing a detailed configuration of a power supply circuit breaking unit according to the first embodiment.

FIG. 2 is a diagram showing a detailed configuration of the power supply circuit breaking unit 7.

The power supply circuit breaking unit 7 includes: a first fusible link $FL_1$; a second fusible link $FL_2$; a transistor 6A; and a relay circuit 5A. The first fusible link $FL_1$ has one end thereof connected to the positive (+) terminal of the battery 2 and the other end thereof connected to the first electric system 3. The second fusible link $FL_2$ has one end thereof connected to the positive (+) terminal of the battery 2 and the other end thereof connected to the second electric system 4. The transistor 6A receives an air bag operating signal $S_{AB}$ at the base terminal thereof, amplifies the received air bag operating signal $S_{AB}$, and outputs the amplified air bag signal as a circuit breaking control signal $S_{SD}$. The relay circuit 5A not only is connected to the first fusible link $FL_1$, but also short-circuits the first fusible link $FL_1$ while driven by the circuit breaking control signal $S_{SD}$ to close the normally opened contact.

In this case, the allowable electric capacity of the second fusible link $FL_2$ is set to a value smaller than the allowable electric capacity of the first fusible link $FL_1$ so as to match the electric capacity of the second electric system 4 that is smaller than the electric capacity of the first electric system 3 (the same applies to the following embodiments).

Figure 3A:
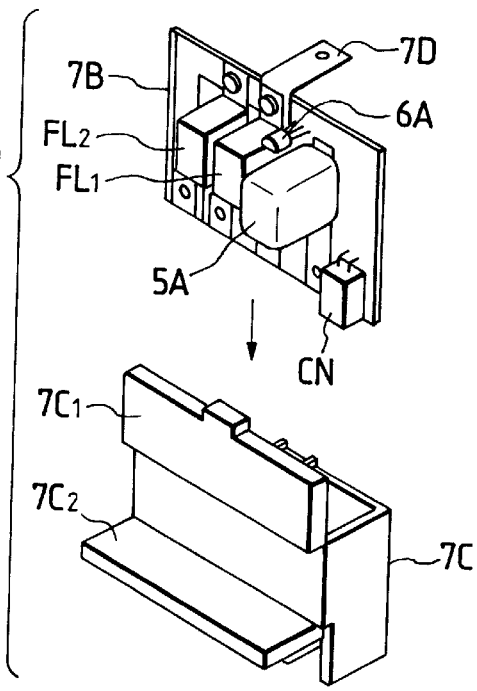
FIGS. 3(a) to 3(c) are diagrams showing the appearance of the power supply circuit breaking unit according to the first embodiment.
Figure 3B:
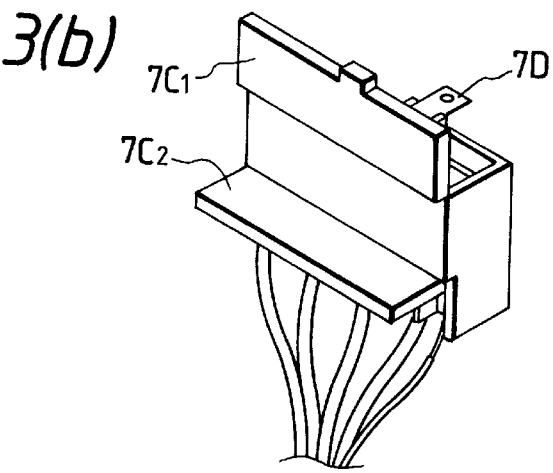

FIG. 3(a) is an exploded perspective view of the power supply circuit breaking unit 7; FIG. 3(b) is a perspective view showing the appearance of the power supply circuit breaking unit 7 with cables connected; and FIG. 3(c) is a view showing the appearance of the power supply circuit breaking unit 7 with the cables connected.

As shown in FIG. 4, the power supply circuit breaking unit 7 has a printed board 7B and a casing 7C. The printed board 7B has the first fusible link $FL_1$, the second fusible link $FL_2$, the relay circuit 5A, the transistor 6A, and a connector CN mounted thereon, and also has a printed wiring 7A forming power supply paths and a fixing fitting 7D formed thereon. The casing 7C has cover portions $7C_1$, $7C_2$ and allows the printed board 7B to be inserted thereinto so that the printed board 7B can be protected. It may be noted that the cover portions $7C_1$, $7C_2$ are depicted in an opened condition in FIG. 3.

Figure 3C:
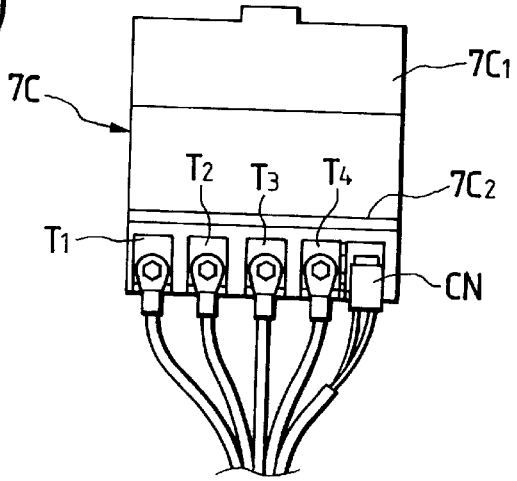

As shown in FIGS. 3(b) and 3(c), sheathed cables are connected to the terminals $T_1$ to $T_4$ (see FIG. 4) of the printed wiring 7A.

Figure 5:
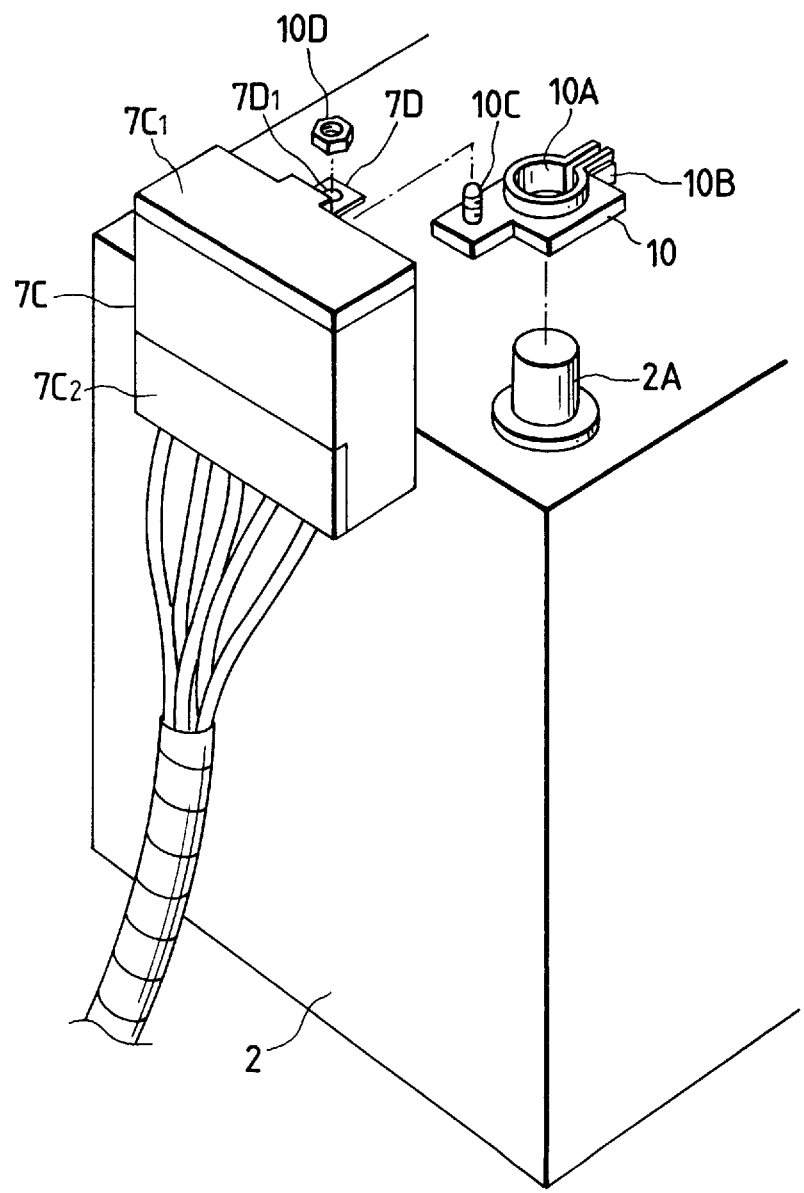
FIG. 5 is a diagram illustrative of a mounting condition of the power supply circuit breaking unit according to the first embodiment.

FIG. 5 is a diagram illustrative of a mounting condition of the power supply circuit breaking unit 7.

First, a clamping portion 10A of a unit mounting jig 10 is fitted over the positive terminal 2A of the battery 2 and is fixed thereto by tightening a mounting screw 10B.

Then, a unit mounting bolt portion 10C of the unit mounting jig 10 is inserted into a mounting hole $7D_1$ of the fixing fitting 7D and is fixed thereto by a unit mounting nut 10D.

As a result, the power supply circuit breaking unit 7 is fixed to the battery 2.

Figure 6:
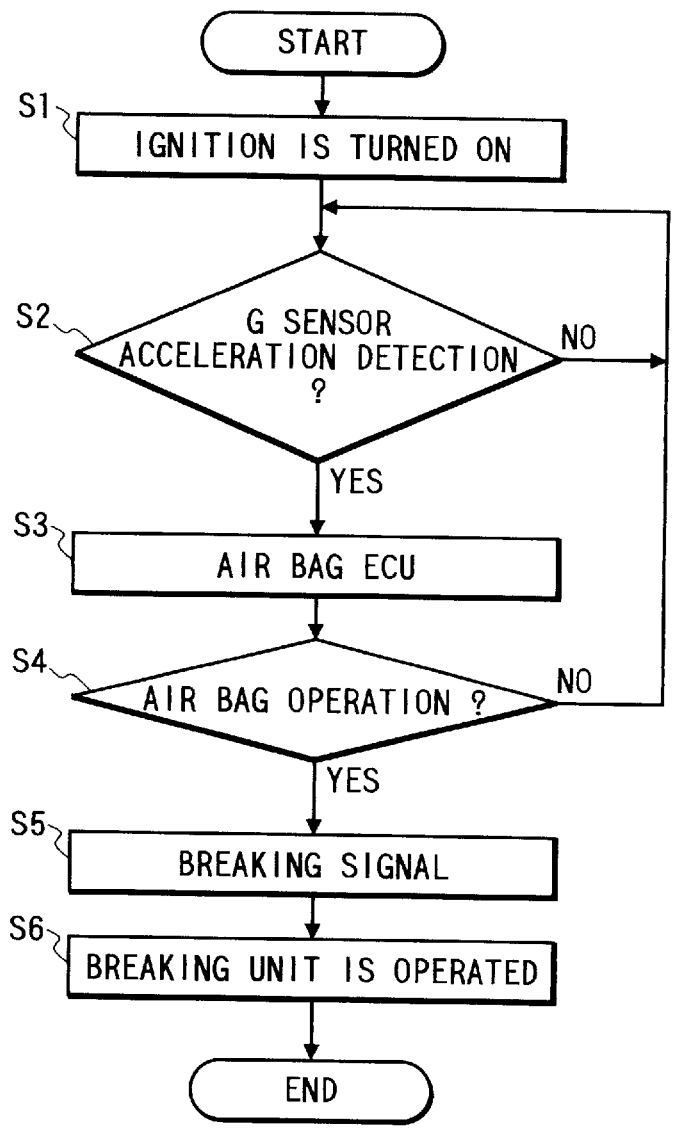
FIG. 6 is a processing flowchart of the first embodiment.

Then, an operation of the power supply circuit breaking unit will be described with reference to the processing flowchart shown in FIG. 6 as well as to FIGS. 1 and 2.

When the ignition switch of the motor vehicle has been turned on (Step S1), the not shown air bag ECU judges whether or not an acceleration sensor (G sensor) has detected an acceleration equivalent to an acceleration (an acceleration when the motor vehicle crashes in an accident) that is equal to or greater than a preset predetermined acceleration (Step S2).

If it is judged that an acceleration that is equal to and greater than the preset predetermined acceleration has not been detected (the answer is "No" in Step S2), then the air bag ECU waits.

If it is judged that an acceleration that is equal to or greater than the preset predetermined acceleration has been detected (the answer is "Yes" in Step S2), the air bag ECU starts operating (Step S3), and judges whether or not the air bag is to be operated based on the waveform of the acceleration signal (Step S4).

If the air bag is not to be operated (the answer is "No" in Step S4), then the air bag ECU goes to Step S2 and waits.

If the air bag is to be operated (the answer is "Yes" in Step S4), then the air bag ECU applies an air bag operating signal to the inflator and the circuit breaking control unit 6.

As a result, the transistor 6A of the circuit breaking control unit 6 turns on, and applies a circuit breaking control signal $S_{SD}$ to the circuit breaking unit 5 (Step S5).

When the circuit breaking control signal $S_{SD}$ has been received, the relay circuit 5A of the circuit breaking unit 5 has the normally opened contact thereof closed by the circuit breaking control signal $S_{SD}$, which in turn causes the first fusible link $FL_1$ to be short-circuited.

An overcurrent flows through the first fusible link $FL_1$ that has been short-circuited, and the first fusible link $FL_1$ is fused (Step S6). In this case, since power for applying the circuit breaking control signal $S_{SD}$ is supplied through the second fusible link $FL_2$, the relay circuit 5A can be kept closed.

As a result, even if the first fusible link $FL_1$ failed to be fused by its own heating, the first fusible link $FL_1$ can be fused rapidly as well as forcibly. Hence, the supply of power to the first electric system 3 can be stopped, which in turn contributes to preventing occurrence of fires caused by short-circuits or the like at wiring harnesses.

In this case, since the second fusible link $FL_2$ remains conducting, the damaged motor vehicle can be moved to the edge of a road or the like with ease by driving the engine after the driver or the like has checked the condition.

In the aforementioned first embodiment, the power supply circuit breaking unit 7 is of a simple construction and can be fabricated at low cost. Therefore, what is required at maintenance is to merely replace the whole body of the power supply circuit breaking unit 7. Hence, the maintenance is made easy.

Further, in the aforementioned first embodiment, the relay circuit 5A that constitutes the circuit breaking unit 5 may be an inexpensive relay circuit whose normally-opened contact is melted and deposited after the operation as long as such inexpensive relay circuit can cause the first fusible link $FL_1$ to be fused.

As a result, the power supply circuit breaking unit 7 can be fabricated at a lower cost.

Still further, while the electric systems are divided into two in the description of the aforementioned first embodiment, if no considerations are given to moving the motor vehicle after the accident, it may be designed in such a manner that only one electric system that is equivalent to the first electric system 3 is arranged and that the supply of power to such electric system is interrupted.

Still further, while the power supply path including the second fusible link $FL_2$ that supplies power to the second electric system 4 is formed integrally within the power supply circuit breaking unit 7 in the aforementioned first embodiment, these members may be formed outside the power supply circuit breaking unit 7. As a result, the power supply circuit breaking unit 7 can be downsized.

Second Embodiment

While a fusible link is designed to be fused in a short-circuited condition in the aforementioned first embodiment, the second embodiment is characterized as interrupting the supply of power by mechanically cutting a fusible link. The same or like parts and components as those of the first embodiment are denoted as the same reference numerals, and the detailed descriptions thereof will be omitted.

Figure 7:
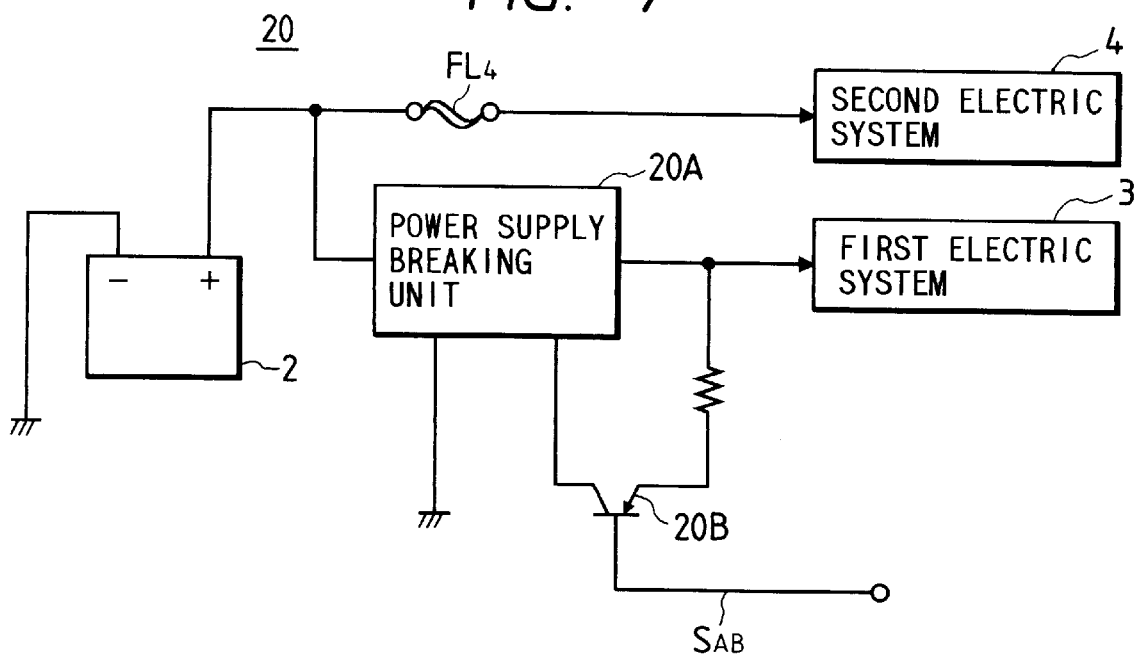
FIG. 7 is a block diagram showing a general configuration of a power supply circuit breaking system, which is a second embodiment.

FIG. 7 is a diagram showing a general configuration of a power supply circuit breaking system 20.

The power supply circuit breaking system 20 has a power supply circuit breaking unit 20A, a second fusible link $FL_4$, and a transistor 20B. The power supply circuit breaking unit 20A includes a first fusible link $FL_3$ (see FIG. 8), one end of the first fusible link $FL_3$ being connected to the positive (+) terminal of the battery 2 and the other end thereof connected to the first electric system 3, and mechanically cuts the first fusible link $FL_3$ at the time the power supply circuit breaking unit 20A is operated. The second fusible link $FL_4$ has one end thereof connected to the positive (+) terminal of the battery 2 and the other end thereof connected to the second electric system 4. The transistor 20B receives an air bag operating signal $S_{AB}$ at the base terminal thereof, amplifies the air bag operating signal $S_{AB}$, and outputs the amplified signal as a circuit breaking control signal $S_{SD}$.

Figure 8:
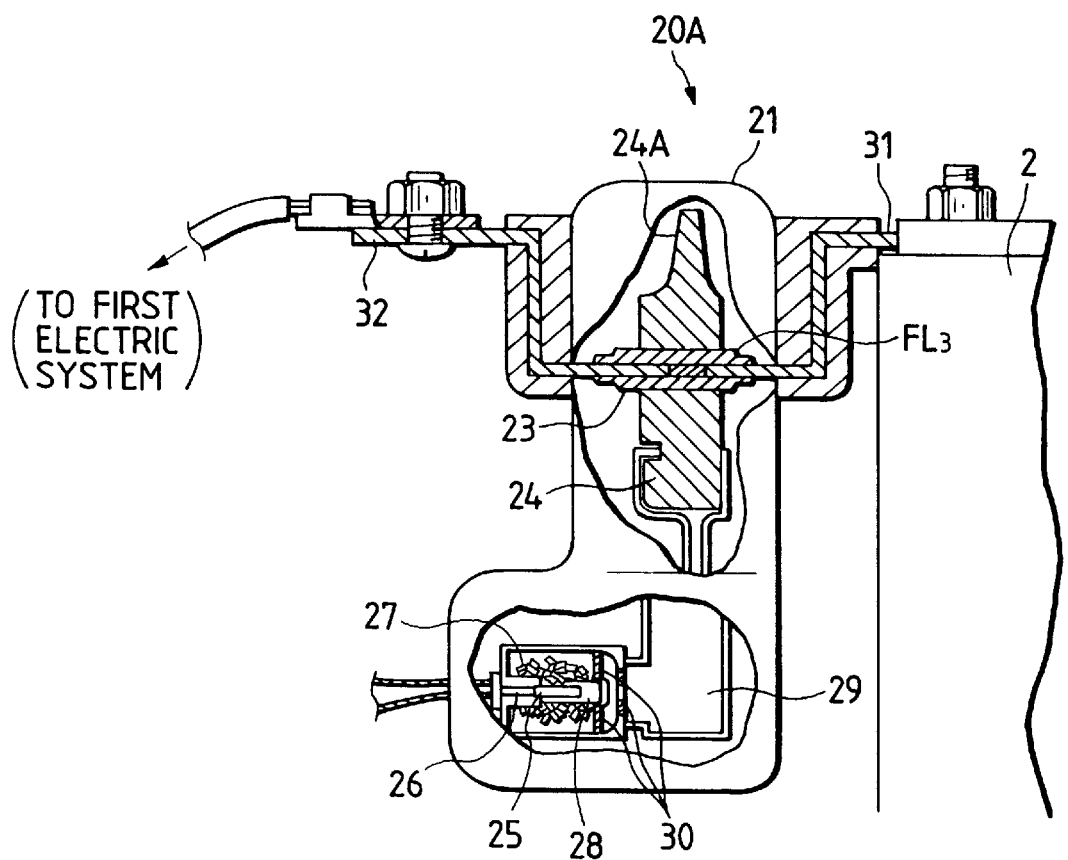
FIG. 8 is a partial sectional view of a power supply circuit breaking unit according to the second embodiment.

FIG. 8 is a partial sectional view of the power supply circuit breaking unit.

The power supply circuit breaking unit 20A includes: a casing 21; an inflator 22; a rotor 24; a first fixing fitting 31; and a second fixing fitting 32. The inflator 22 is arranged within the casing 21 and produces high-pressure nitrogen gas (high-pressure N2 gas) upon reception of an air bag operating signal $S_{AB}$ (see FIG. 1) through a signal line. The rotor 24 not only rotates with a shaft 23 as a rotating shaft by the high-pressure N2 gas produced by the inflator 22, but also has a ceramic cutter 24A that serves as a blade portion for cutting the first fusible link $FL_3$ (equivalent of the fusible link $FL_1$ shown in FIG. 2) arranged therein. The rotor 24 is made of nonconducting ceramics. The first fixing fitting 31 mounts the power supply circuit breaking portion 20A on the battery 2. The second fixing fitting 32 connects first electric system 3 cables to the power supply circuit breaking unit 20A.

The inflator 22 includes: an electric heater 26; a transfer charge (enhancer) 28; and a filter 30. The electric heater 26 is heated upon reception of a circuit breaking control signal SSD obtained by causing the transistor 20B to amplify an air bag operating signal $S_{AB}$ and ignites an explosive 25. The transfer charge 28 is ignited by the explosive 25 having ignited and burns a gas producing agent 27 that is a mixture of sodium azide, molybdenum disulfide, and the like to thereby produce high-pressure N2 gas. The filter 30 prevents the gas producing agent 27 from getting outside and releases only the high-pressure N2 gas into a pressure chamber 29.

Figure 9:
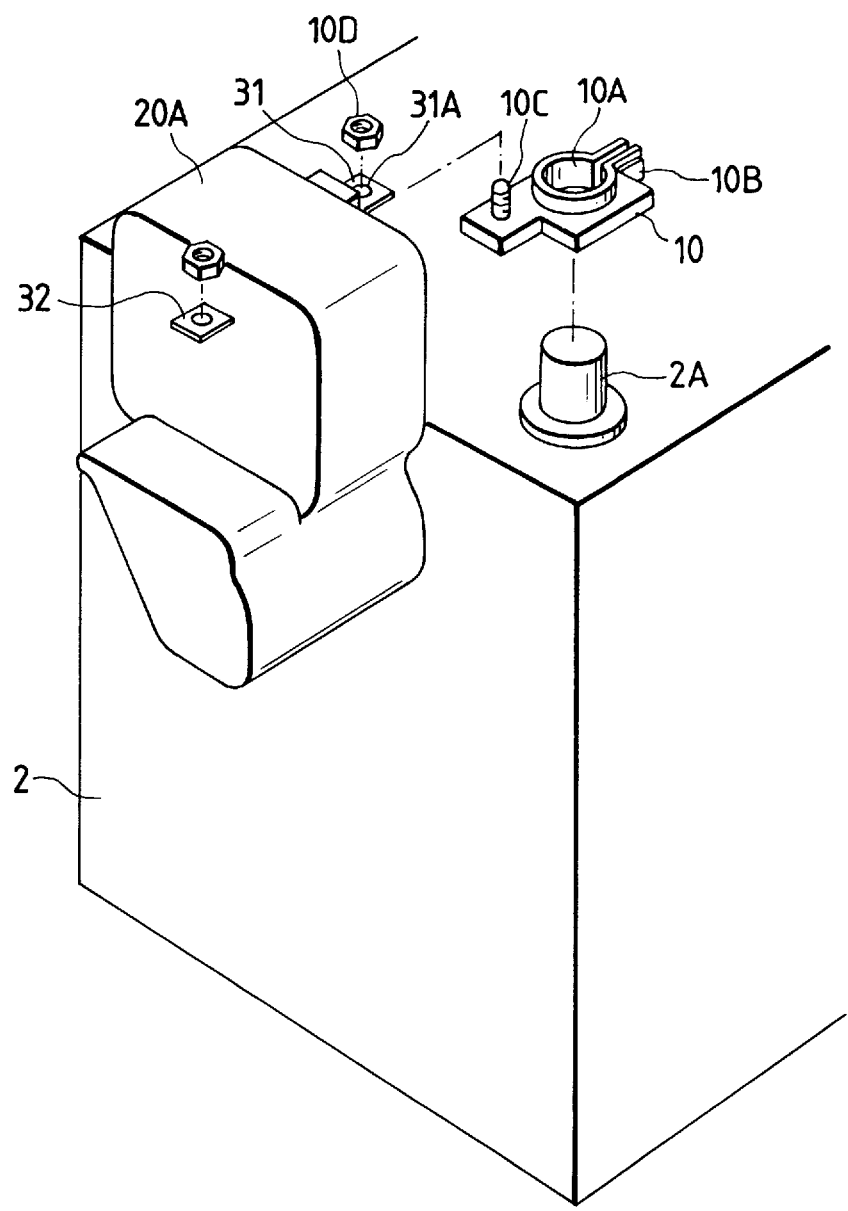
FIG. 9 is a diagram showing a mounting condition of the power supply circuit breaking unit according to the second embodiment.

FIG. 9 is a diagram showing a mounting condition of the power supply circuit breaking unit 20A.

First, a clamping portion 10A of a unit mounting jig 10 is fitted over the positive terminal 2A of the battery 2 and is fixed thereto by tightening a mounting screw 10B.

Then, a unit mounting bolt portion 10C of the unit mounting jig 10 is inserted into a mounting hole 31A of the first fixing fitting 31 and is fixed thereto by a unit mounting nut 10D.

As a result, the power supply circuit breaking unit 7 is fixed to the battery 2.

Then, an operation of the power supply circuit breaking unit will be described with reference to the partially sectional view of the power supply circuit breaking unit shown in FIG. 8.

When the ignition switch of the motor vehicle has been turned on, the not shown air bag ECU judges whether or not the acceleration sensor (G sensor) has detected an acceleration equivalent to an acceleration (an acceleration when the motor vehicle crashes in an accident) that is equal to or greater than a preset predetermined acceleration.

If it is judged that an acceleration that is equal to or greater than the preset predetermined acceleration has been detected, the air bag ECU starts operating, and judges whether or not the air bag is to be operated based on the waveform of the acceleration signal. If it is judged that the air bag is to be operated, the air bag ECU applies an air bag operating signal to the inflator and the circuit breaking control system 20.

As a result, the air bag operating signal $S_{AB}$ is applied also to the transistor 20B of the circuit breaking control system 20, and the transistor 20B amplifies the air bag operating signal $S_{AB}$ and outputs the amplified signal as a circuit breaking control signal $S_{SD}$ through the signal line to the electric heater 26 of the inflator 22.

Figure 10A:
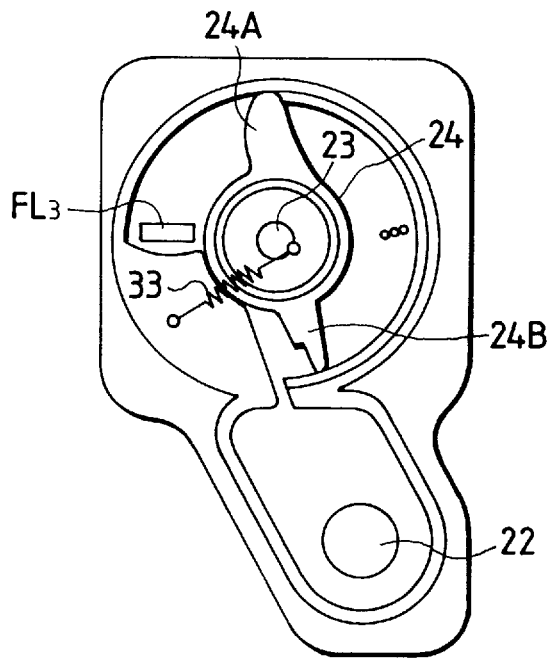
FIGS. 10(a) to 10(d) are diagrams illustrative of an operation of the power supply circuit breaking unit according to the second embodiment.

In this case, it is supposed that the rotor 24 is urged by a coil spring 33 so as to be fixed at a predetermined position in the initial condition (before ignition; see FIG. 10(a)).

The electric heater 26 is heated upon reception of a circuit breaking control signal $S_{SD}$ and ignites the explosive 25.

Figure 10B:
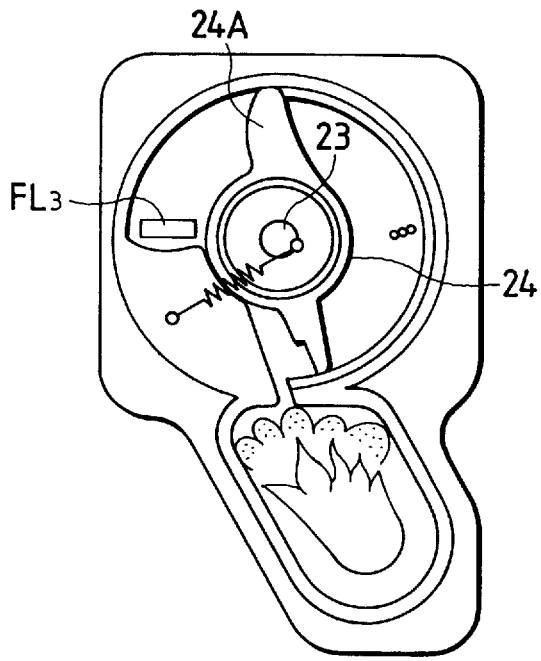

When the explosive 25 ignites, so does the transfer charge (enhancer) 28, causing the gas producing agent 27 that is a mixture of sodium azide, molybdenum disulfide, and the like to burn to thereby produce high-pressure N2 gas (during ignition; see FIG. 10(b)).

Figure 10C:
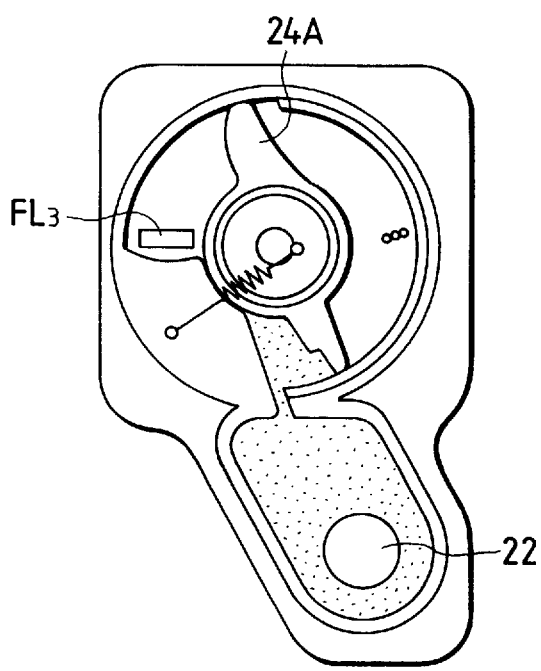

The high-pressure N2 gas produced within the inflator 22 passes through the filter 30 that is arranged so as not to allow the gas producing agent 27 to get outside, expands, and rotates the rotor 24 with the shaft 23 as a rotating shaft by pressing a fin portion 24B of the rotor 24 (after ignition; see FIG. 10(c)).

Figure 10D:
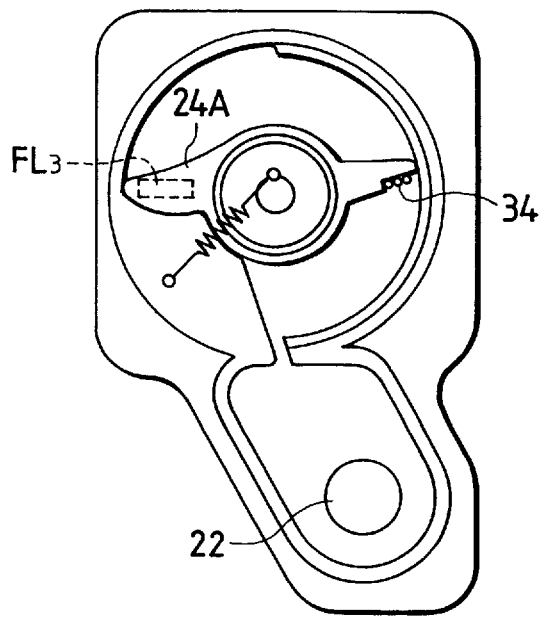

The produced high-pressure N2 gas further expands and mechanically cuts the first fusible link $FL_3$ with the ceramic cutter 24 by rotating the rotor 24, thereby interrupting the supply of power (fusible link cut; see FIG. 10(d)). When the first fusible link $FL_3$ has been cut completely, the fin portion 24B of the rotor 24 comes past the position at which a gas exhaust port 34 is arranged. The produced high-pressure gas is thus released outside the casing 21 of the power supply circuit breaking unit 20A through the gas exhaust port 34, thereby allowing the gas remaining within the casing 21 to be reduced to a predetermined level.

As a result, even if the first fusible link $FL_3$ failed to be fused by its own heating, the first fusible link $FL_3$ can be cut rapidly as well as forcibly. Hence, the supply of power to the first electric system 3 is stopped, which in turn contributes to preventing occurrence of fires caused by short-circuits or the like at wiring harnesses. Further, since the ceramic cutter, which is made of an insulating material, is used, insulation is still provided even if the ceramic cutter remains as it has cut the first fusible link $FL_3$. As a result, reliable power supply circuit breaking can be implemented.

Even in this case, similar to the first embodiment, the second fusible link $FL_4$ remains conducting. Therefore, the damaged motor vehicle can be moved to the edge of a road or the like with ease by driving the engine after the driver or the like has checked the trouble.

Since the power supply circuit breaking unit 20A is of a simple construction in the aforementioned second embodiment, power supply circuit breaking can be implemented reliably.

Further, since what is required is to merely replace the whole body of the power supply circuit breaking unit 20A after the power supply circuit breaking unit has been operated, maintenance can be made easy.

Still further, while the electric systems are divided into two in the description of the aforementioned second embodiment, if no considerations are given to moving the motor vehicle after the accident, it may be designed in such a manner that only one electric system that is equivalent to the first electric system 3 is arranged and that the supply of power to such electric system is interrupted.

Still further, while the power supply path including the second fusible link $FL_4$ that supplies power to the second electric system 4 is arranged outside the power supply circuit breaking unit 20A in the aforementioned second mode of embodiment, these members may be formed integrally within the power supply circuit breaking unit 7. As a result, the operation of mounting the power supply circuit breaking unit 7 and other operation can be facilitated, thereby improving maintainability.

Still further, while the fusible link is cut by rotating the ceramic cutter in the aforementioned second embodiment, it may also be designed that the ceramic cutter is driven linearly to cut a fusible link.

Third Embodiment

The aforementioned first embodiment and second embodiment hold the power supply circuit breaking condition irreversibly and require that the power supply circuit breaking unit be replaced after the power supply circuit breaking unit has been operated. However, in the third embodiment, a breaker is used as a power supply circuit breaking unit, so that the power supply circuit breaking unit can be reset with ease.

Figure 11:
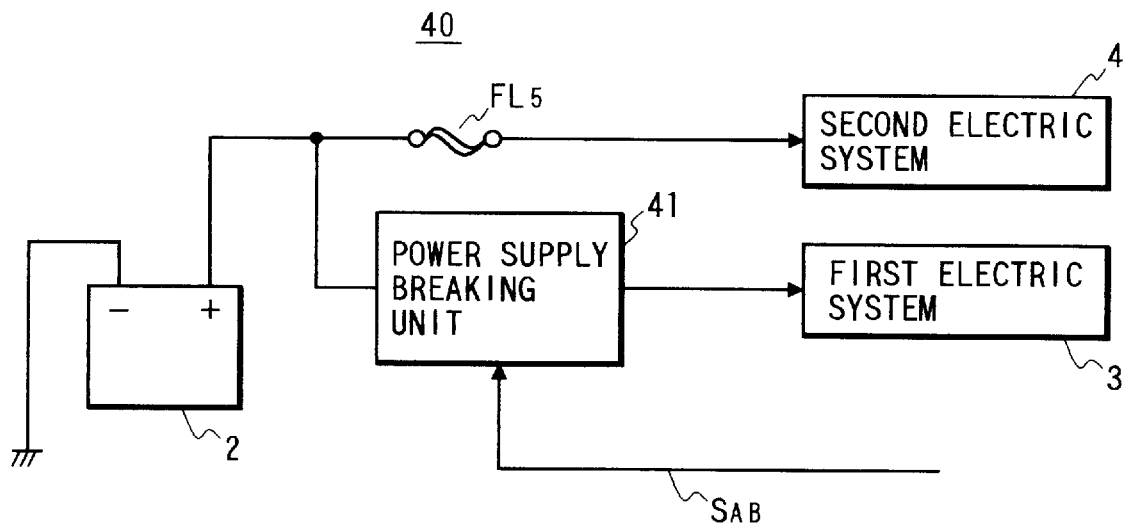
FIG. 11 is a block diagram showing a general configuration of a power supply circuit breaking system, which is a third embodiment.

FIG. 11 is a block diagram showing a general configuration of a power supply circuit breaking system 40. In FIG. 11, the same or like parts and components as those shown in FIG. 2 are denoted as the same reference numerals, and the detailed descriptions thereof will be omitted.

The power supply circuit breaking system 40 has a power supply circuit breaking unit 41, and a fusible link $FL_5$. The power supply circuit breaking unit 41 has the power supply input terminal thereof connected to the positive (+) terminal of the battery 2 and the power supply output terminal thereof connected to the first electric system 3, and receives an air bag operating signal $S_{AB}$. The fusible link $FL_5$ has one end thereof connected to the positive (+) terminal of the battery 2 and the other end thereof connected to the second electric system 4.

Figure 12:
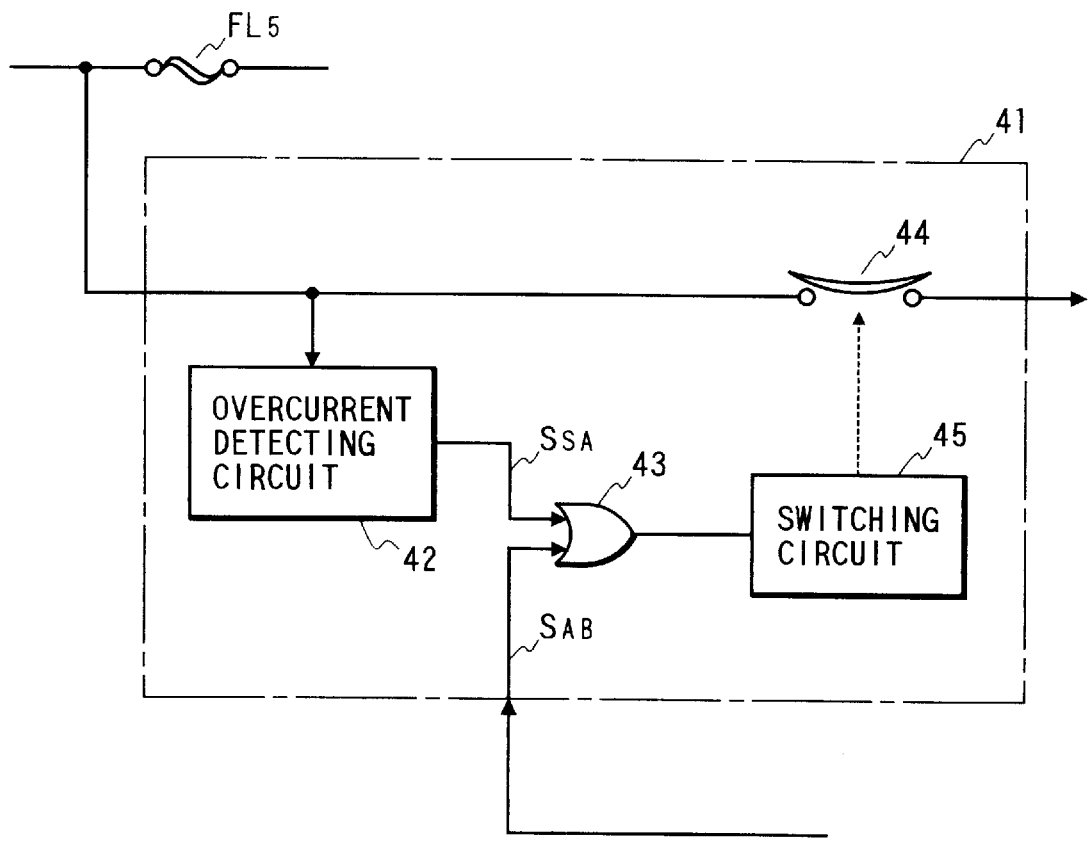
FIG. 12 is a block diagram showing a detailed configuration of a power supply circuit breaking unit according to the third embodiment.

FIG. 12 is a block diagram showing a detailed configuration of the power supply circuit breaking unit 41.

The power supply circuit breaking unit 41 has an overcurrent detecting circuit 42, an OR circuit 43, and a switching circuit 45. The overcurrent detecting circuit 42 detects an overcurrent along the power supply path and outputs an overcurrent detection signal $S_{SA}$ during normal operation. The OR circuit 43 receives an overcurrent detection signal $S_{SA}$ at one input terminal thereof and an air bag operating signal $S_{AB}$ at the other input terminal, and outputs a circuit breaking control signal $S_{BL}$. The switching circuit 45 opens breaking contacts 44 based on a circuit breaking control signal $S_{BL}$.

Figure 13A:
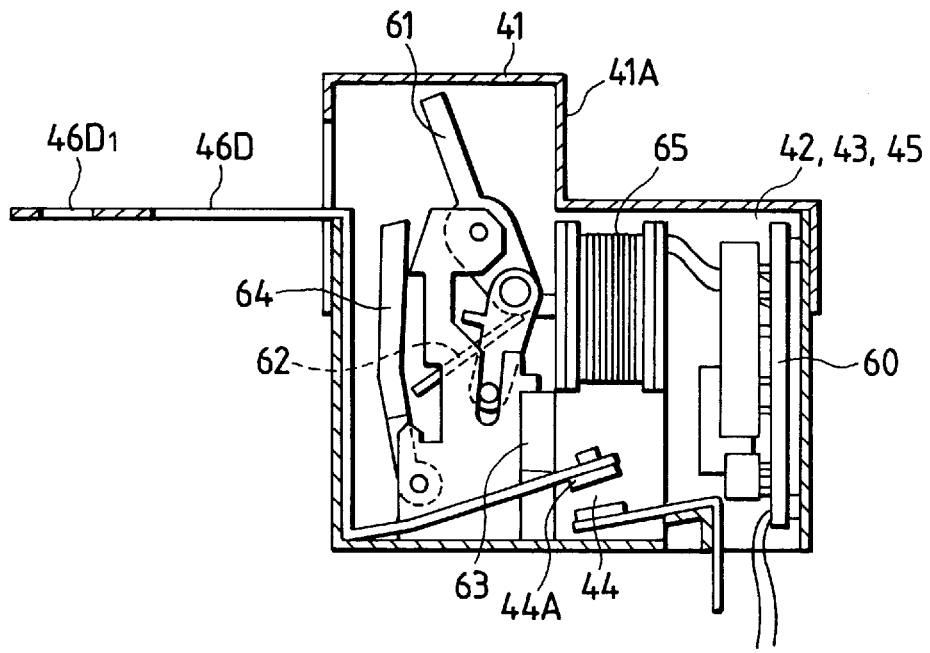
FIGS. 13(a) and 13(b) are partial sectional views of the power supply circuit breaking unit according to the third embodiment.
Figure 13B:
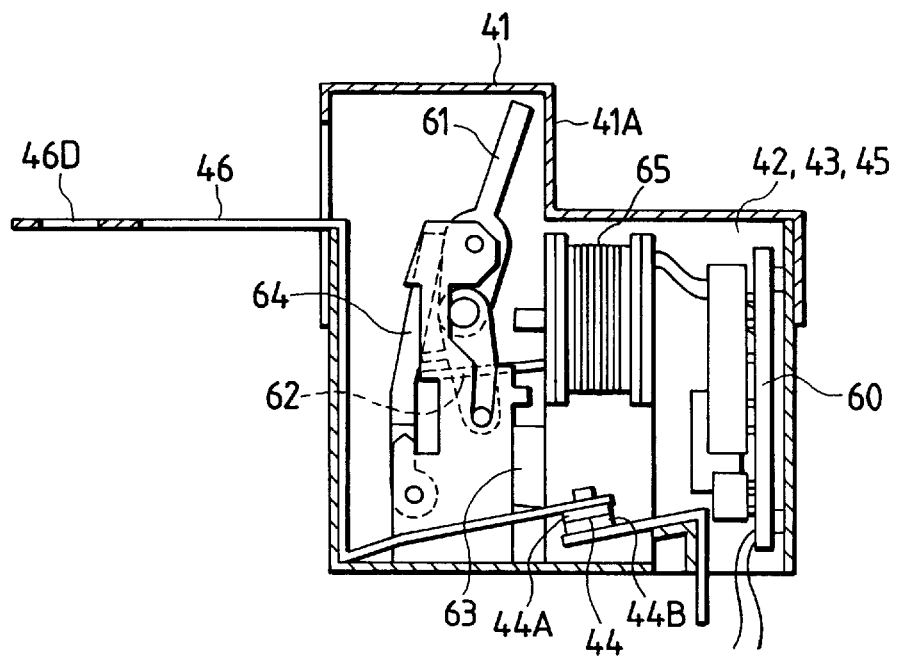

FIG. 13(a) is a partial sectional view of the power supply circuit breaking unit 41 that is in the interrupted condition; and FIG. 13(b) is a partial sectional view of the power supply circuit breaking unit 41 in the conducting condition.

As shown in FIG. 13(a), the power supply circuit breaking unit 41 has a casing 41A and includes a circuit board 60, a reset switch 61, an oscillating piece 62, a pressing block 63, and a solenoid coil 45A within the casing 41A. The circuit board 60 has the overcurrent detecting circuit 42, the OR circuit 43, and the switching circuit 45 formed thereon. The reset switch 61 manually resets the power supply circuit breaking unit 41 after the circuit breaking operation has been performed. The oscillating piece 62 oscillates by operating the reset switch 61 and thereby presses the pressing block 63. The pressing block 63 allows the circuit to conduct by pressing a movable contact 44A constituting the breaker contacts 44 to allow the movable contact 44A to come in contact with a fixed contact 44B constituting the breaker contacts 44 (see FIG. 13(b)), and holds the conducting condition in cooperation with a retaining piece 64. The solenoid coil 45A constitutes part of the switching circuit 45 and releases the retained condition of the retaining piece 64 to open the breaker contacts 44.

Figure 14:
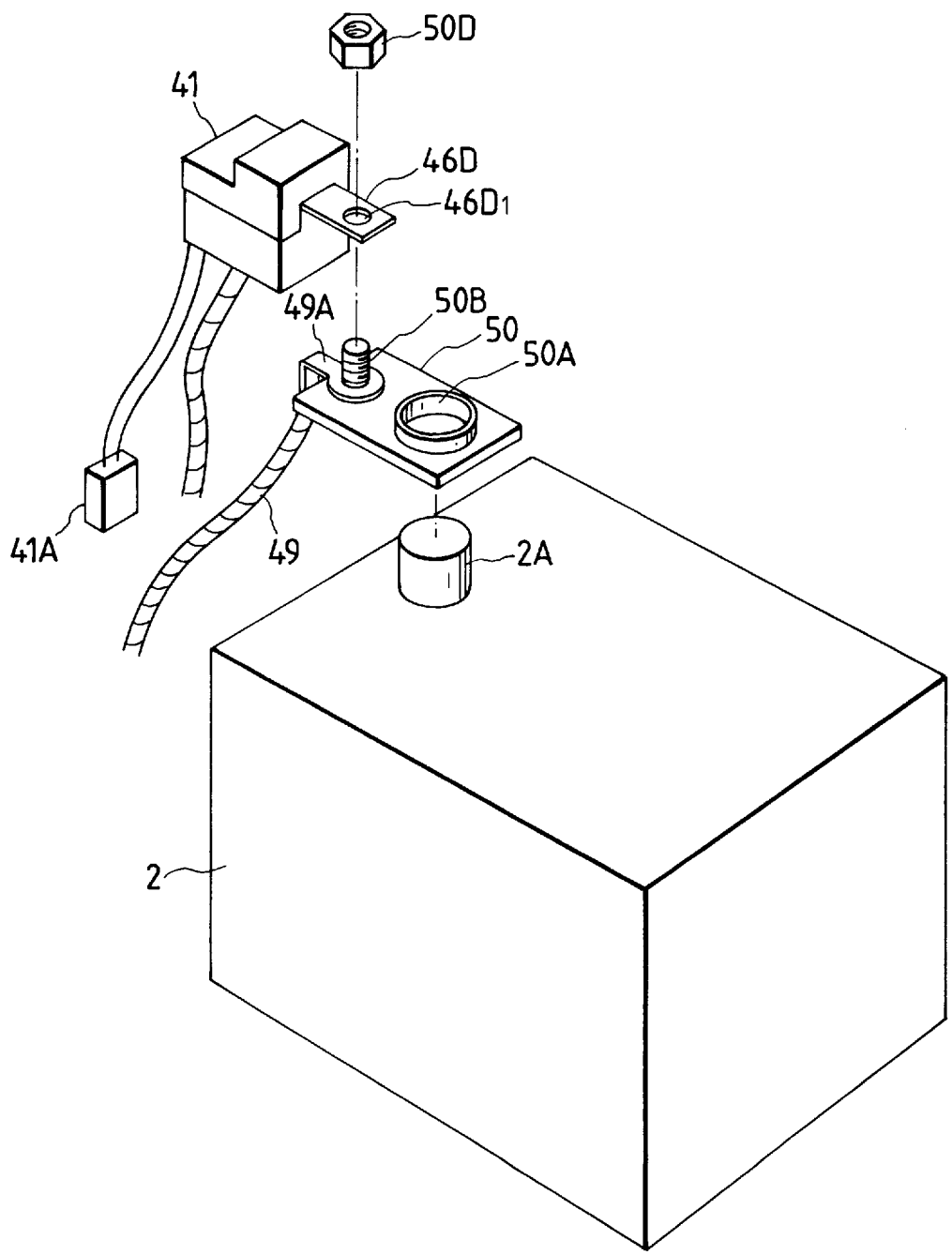
FIG. 14 is a diagram illustrative of a mounting condition of the power supply circuit breaking unit according to the third embodiment.
Figure 15:
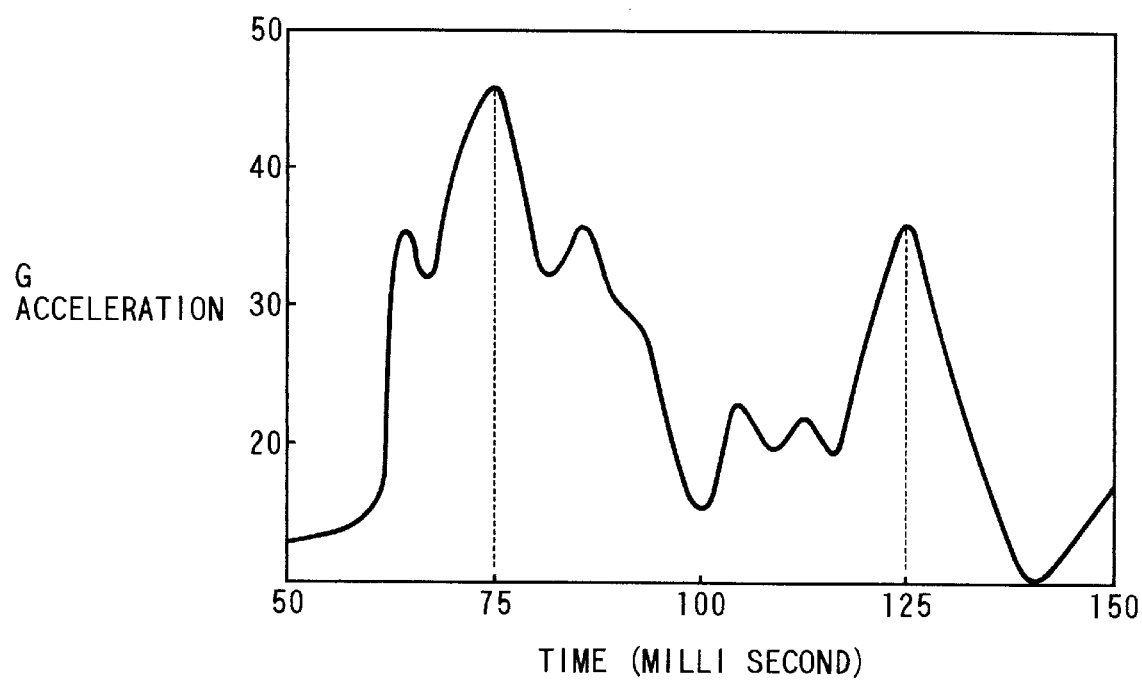
FIG. 15 is a diagram illustrative of conventional problems.

FIG. 14 is a diagram illustrative of a mounting condition of the power supply circuit breaking unit 41.

First, a setting hole 50A of a unit mounting jig 50 is fitted over the positive terminal 2A of the battery 2 and is fixed thereto.

Then, a crimping terminal 49A of a power supply wiring 49 to the second electric system 4 is inserted into a unit mounting bolt portion 50B of the unit mounting jig 50.

Then, the unit mounting bolt portion 50B of the unit mounting jig 50 is inserted into a mounting hole $46D_1$ of a fixing fitting 46D and is fixed thereto by a unit mounting nut 50D, and a connector 41A is connected to a not shown terminal to which an air bag operating signal $S_{AB}$ is inputted.

As a result, the power supply circuit breaking unit 41 is fixed to the battery 2 and is thus electrically connected.

Then, an operation of the power supply circuit breaking unit will be described with reference to FIGS. 12 and 13. In this case, the power supply circuit breaking unit 41 has the breaker contacts 44 closed as shown in FIG. 13(b) in the initial condition.

The overcurrent detecting circuit 42 of the power supply circuit breaking unit 41 applies to the OR circuit 43 an "H" level overcurrent detection signal $S_{SA}$ when an overcurrent has been detected along the power supply path.

Along with this operation, when the ignition switch of the motor vehicle has been turned on, the not shown air bag ECU judges whether or not the acceleration sensor (G sensor) has detected an acceleration equivalent to an acceleration (an acceleration when the motor vehicle crashes in an accident) that is equal to or greater than a preset predetermined acceleration.

If it is judged that an acceleration that is equal to or greater than the preset predetermined acceleration has been detected, the air bag ECU starts operating, and judges whether or not the air bag is to be operated based on the waveform of the acceleration signal. If it is judged that the air bag is to be operated, the air bag ECU applies an "H" level air bag operating signal SAB to the inflator and the circuit breaking control unit 41.

Upon reception of an "H" level overcurrent detection signal $S_{SA}$ or an "H" level air bag operating signal $S_{AB}$, the OR circuit 43 applies a circuit breaking control signal $S_{BL}$ to the switching circuit 45.

Upon reception of a circuit breaking control signal $S_{BL}$, the switching circuit 45 drives the solenoid coil 45A to thereby release the retained condition of the retaining piece 64 and open the breaker contacts 44.

As a result, even if the overcurrent detecting circuit 42 has failed to detect an overcurrent and does not output an "H" level overcurrent detection signal $S_{SA}$. an "H" level air bag operating signal $S_{AB}$ is outputted, so that the breaker contacts 44 can be opened rapidly as well as forcibly. Hence, the supply of power to the first electric system 3 can be stopped, which in turn contributes to preventing occurrence of fires caused by short-circuits or the like at wiring harnesses.

Further, after having checked the safe condition, the power supply circuit breaking unit can be reset to the conducting condition with ease only by operating the reset switch 61.

In this case, since the fusible link $FL_5$ remains conducting, the damaged motor vehicle can be moved to the edge of a road or the like with ease by driving the engine after the driver or the like has checked the condition.

In the aforementioned third embodiment, the power supply circuit breaking unit 41 is of a simple construction, and can not only be fabricated at low cost, but also be reset with ease. As a result, maintenance can be made easy.

Further, while the electric systems are divided into two in the description of the aforementioned third embodiment, if no considerations are given to moving the motor vehicle after the accident, it may be designed in such a manner that only one electric system is arranged by grouping the first electric system 3 and the second electric system 4 in place of the first electric system 3 and that the supply of power to such electric system is interrupted.

Still further, while the power supply path including the fusible link $FL_5$ that supplies power to the second electric system 4 is arranged outside the power supply circuit breaking unit 41 in the aforementioned third mode of embodiment, these members may be formed integrally within the power supply circuit breaking unit 41.

According to the invention of the first aspect, the circuit breaking control means receives an impact detection signal that is outputted from outside when an impact such as a crash of the motor vehicle has been detected, and generates and applies a circuit breaking control signal based on the impact detection signal; and the circuit breaking means breaks the power supply path forcibly and stops the supply of power to the load based on the circuit breaking control signal. Therefore, the supply of power can be stopped immediately at the time the impact has been detected.

According to the invention of the second aspect, the impact detection signal is an air bag operating signal to be applied at the time an air bag is operated, in addition to the advantage provided by the invention of the first aspect. Therefore, the supply of power can be stopped at the time the air bag is operated without arranging any special circuits.

According to the invention of the third aspect, when the circuit breaking means brings the interrupted condition holding means into an interrupted condition forcibly based on the circuit breaking control signal, the interrupted condition holding means holds the interrupted condition irreversibly, so that the power supply path is kept broken, in addition to the advantage provided by the invention of the first or second aspect. Therefore, not only the supply of power can be stopped immediately after the impact has been detected, but also the interrupted condition can be held, which in turn contributes to ensuring further safety.

According to the invention of the fourth aspect, the circuit breaking means brings the fusible link into a cut condition forcibly based on the circuit breaking control signal so as to bring the interrupted condition holding means into the interrupted condition, so that the supply of power is stopped, in addition to the advantage provided by the invention of the third aspect. Therefore, the supply of power can be interrupted by reliably cutting a fusible link even if the fusible link is not fused despite the fact that an electric leakage is occurring.

According to the invention of the fifth aspect, the forcibly short-circuiting means of the circuit breaking means short-circuits the fusible link forcibly to forcibly fuse the fusible link, so that the supply of power is stopped, in addition to the advantage provided by the invention of the forth aspect.

According to the invention of the sixth aspect, the forcibly cutting means of the circuit breaking means mechanically cuts the fusible link, so that the supply of power is stopped, in addition to the advantage provided by the invention of the fourth aspect. Therefore, the supply of power can be interrupted by reliably cutting a fusible link even if the fusible link is not fused despite the fact that an electric leakage is occurring.

According to the invention of the seventh aspect, the inflator of the forcibly cutting means is ignited based on the circuit breaking control signal, and the cutting means mechanically cuts the fusible link while driven by the pressure of the gas produced by the inflator, in addition to the advantage provided by the invention of the sixth aspect. Therefore, the supply of power can be stopped reliably as well as rapidly without being affected so much by abnormal conditions of electric systems.

According to the invention of the eighth aspect, the blade member of the cutting means mechanically cuts the fusible link by rotating about the rotating shaft while driven by the pressure of the gas, so that the supply of power is stopped, in addition to the advantage provided by the invention of the seventh aspect. Therefore, the supply of power can be stopped reliably as well as rapidly even with a simple construction.

According to the invention of the ninth aspect, the circuit breaking control means and the circuit breaking means are integrally formed with each other, in addition to the advantage provided by the invention of any one of the first to eighth aspects. Therefore, these member can be replaced as a single body, and maintenance can be made easy.

According to the invention of the tenth aspect, when the circuit breaking means brings the interrupted condition holding means of the power supply path into the interrupted condition forcibly based on the circuit breaking control signal, the interrupted condition holding means holds the interrupted condition reversibly, in addition to the advantage provided by the invention of the first or second aspect. Therefore, the interrupted condition can be reset with ease, and maintenance is made easy.

According to the invention of eleventh aspect, the power supply circuit breaking apparatus has a second power supply path for supplying power to a second load from the battery, the second load being different from the load, in addition to the advantage provided by the invention of any one of the first to tenth aspect. Therefore, even if the supply of power is stopped to the load, power can be continuously supplied to the second load. If, e.g., an electric system that is essential to move the motor vehicle is selected as the second load, the motor vehicle can be moved, etc.

According to the invention of twelfth aspect, the current capacity supplied to the second load through the second power supply path is set to a value smaller than the current capacity supplied to the load through the power supply path by a predetermined quantity, in addition to the advantage provided by the invention of the eleventh aspect. Therefore, in the case where the second load is continuously supplied with power and an independent power supply circuit breaking apparatus is arranged on the second load side, a power supply circuit breaking apparatus having a small electric capacity may be used, which in turn contributes to ensuring safety with ease.

According to the invention of the thirteenth aspect, the second load is a minimum electric system that is essential to cause the motor vehicle to travel, in addition to the advantage provided by the invention of the eleventh or twelfth aspect. Therefore, the motor vehicle can be caused to travel even with the supply of power to the load interrupted. As a result, the motor vehicle can be moved to the edge of a road or the like with ease at the time of an accident or the like.

According to the invention of the fourteenth aspect, the second power supply path supplies power to a second load from the battery, the second load being different from the load. If, e.g., a minimum electric system that is essential to move the motor vehicle is selected as the second load, the motor vehicle can be moved, etc.

According to the invention of the fifteenth aspect, the current capacity supplied to the second load through the second power supply path is set to a value smaller than the current capacity supplied to the load through the power supply path by a predetermined quantity, in addition to the advantage provided by the invention of the fourteenth aspect. Therefore, in the case where the second load is continuously supplied with power and an independent power supply circuit breaking apparatus is arranged on the second load side, a power supply circuit breaking apparatus having a small electric capacity may be used, which in turn contributes to ensuring safety with ease.

According to the invention of the sixteenth aspect, the second load is a minimum electric system that is essential to cause the motor vehicle to travel, in addition to the advantage provided by the invention of the fourteenth or fifteenth aspect. Therefore, the motor vehicle can be caused to travel even with the supply of power to the load interrupted. As a result, the motor vehicle can be moved to the edge of a road or the like with ease at the time of an accident or the like.

What is claimed is:

1. A power supply circuit breaking apparatus for a motor vehicle, comprising:
   a first power supply path for supplying power to a first load from a battery to be mounted on the motor vehicle;
   a second power supply path for supplying power to a second load from the battery, the second load being different from the first load;
   a circuit breaking control means for receiving an impact detection signal outputted when an impact such as a crash of the motor vehicle has been detected from outside, and generating and applying a circuit breaking control signal based on the impact detection signal; and
   a circuit breaking means for interrupting the first power supply path forcibly and stopping the supply of power to the first load based on the circuit braking control signal.

2. A power supply circuit breaking apparatus for a motor vehicle according to claim 1, wherein
   the impact detection signal is an air bag operating signal to be applied at the time an air bag is operated.

3. A power supply circuit breaking apparatus for a motor vehicle according to claim 1, wherein
   the first power supply path includes an interrupted condition holding means for holding an interrupted condition irreversibly; and
   the circuit breaking means brings the interrupted condition holding means into an interrupted condition forcibly based on the circuit breaking control signal.

4. A power supply circuit breaking apparatus for a motor vehicle according to claim 3, wherein
   the interrupted condition holding means includes a fusible link; and
   the circuit breaking means brings the fusible link into a cut condition forcibly based on the circuit breaking control signal so as to bring said interrupted condition holding means into the interrupted condition.

5. A power supply circuit breaking apparatus for a motor vehicle according to claim 4, wherein
   the circuit breaking means has a forcibly short-circuiting means for short-circuiting the fusible link forcibly.

6. A power supply circuit breaking apparatus for a motor vehicle according to claim 4, wherein
   the circuit breaking means has a forcibly cutting means for mechanically cutting the fusible link.

7. A power supply circuit breaking apparatus for a motor vehicle according to claim 6, wherein the forcibly cutting means comprises:
   an inflator that is ignited based on the circuit breaking control signal; and
   a cutting means that is driven by a pressure of a gas produced by the inflator.

8. A power supply circuit breaking apparatus for a motor vehicle according to claim 7, wherein the cutting means comprises:
   a rotating shaft; and
   a blade member for mechanically cutting the fusible link by rotating about the rotating shaft while driven by the pressure of the gas, the blade member being made of a nonconducting material.

9. A power supply circuit breaking apparatus for a motor vehicle according to claim 1, wherein
   the circuit breaking control means and the circuit breaking means are integrally formed with each other.

10. A power supply circuit breaking apparatus for a motor vehicle according to claim 1, wherein
    the first power supply path includes an interrupted condition holding means that not only holds an interrupted condition reversibly, but also is manually resettable to a conducting condition from the interrupted condition; and
    the circuit breaking means brings the interrupted condition holding means into the interrupted condition forcibly based on the circuit breaking control signal.

11. A power supply circuit breaking apparatus for a motor vehicle according to claim 1, wherein
    a current capacity supplied to the second load through the second power supply path is set to a value smaller than a current capacity supplied to the first load through the first power supply path by a predetermined quantity.

12. A power supply circuit breaking apparatus for a motor vehicle according to claim 1, wherein
    the second load is minimum electric system that is essential to cause the motor vehicle to travel.

13. A power supply circuit breaking system for a motor vehicle, comprising:
    a power supply circuit breaking apparatus,
    wherein the power supply circuit breaking apparatus includes
    a first power supply path for supplying power to a first load from a battery to be mounted on the motor vehicle;
    a second power supply path for supplying power to a second load from the battery, the second load being different from the first load;
    a circuit breaking control means for receiving an impact detection signal outputted when an impact such as a crash of the motor vehicle has been detected from outside, and generating and applying a circuit breaking control signal based on the impact detection signal; and
    a circuit breaking means for interrupting the first power supply path forcibly and stopping the supply of power to the first load based on the circuit braking control signal.

14. A power supply circuit breaking system for a motor vehicle according to claim 13, wherein
    a current capacity supplied to the second load through the second power supply path is set to a value smaller than a current capacity supplied to the load through the power supply path by a predetermined quantity.

15. A power supply circuit breaking system for a motor vehicle according to claim 13, wherein
    the second load is a minimum electric system that is essential to cause the motor vehicle to travel.

* * * * *